Dec. 21, 1965 J. S. CUBERT 3,225,220

LOGIC CIRCUIT USING STORAGE DIODES TO ACHIEVE NRZ OPERATION OF A TUNNEL DIODE

Filed Aug. 29, 1963

INVENTOR
JACK SAUL CUBERT
BY J. Donald Weber Jr.
AGENT 3,225,220

LOGIC CIRCUIT USING STORAGE DIODES TO ACHIEVE NRZ OPERATION OF A TUNNEL DIODE

Jack Saul Cubert, Willow Grove, Pa., assignor to Sperry Rand Corporation, New York, N.Y., a corporation of Delaware Filed Aug. 29, 1963, Ser. No. 305,439
8 Claims. (Cl. 307—88.5)

Figure 1:
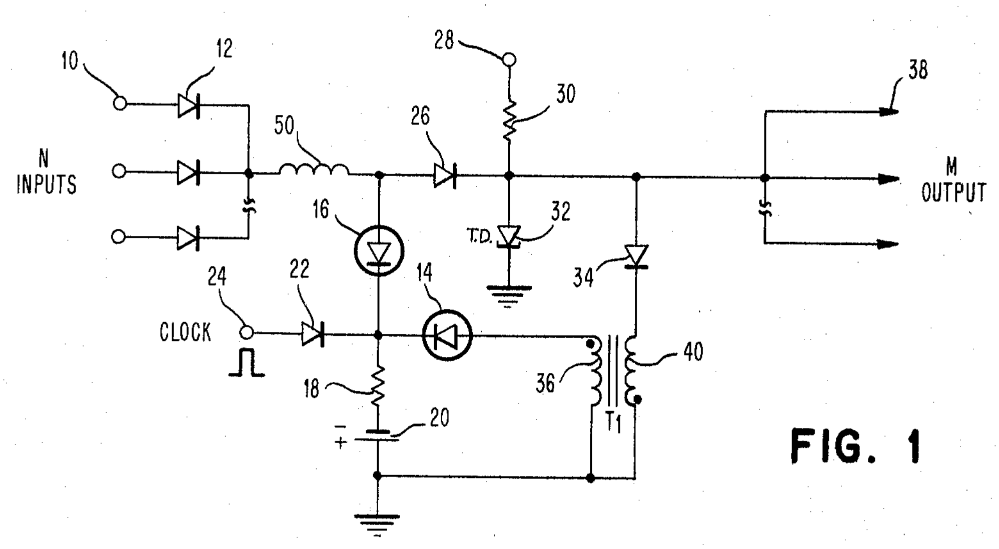

This invention relates to a circuit which performs the OR logic function. More particularly, the logic function is a non-inverting operation and the circuit utilizes tunnel diodes and stored-charge diodes. In addition, the circuit performs the OR-logic function using non-return-to-zero (NRZ) operation.

In the design and manufacture of many types of electronic systems, for example large scale computers and other electronic data processing equipment, a large number of logic circuits are required. These logic circuits include the AND, NOR and OR logic functions. Other logic functions may be desired but those enumerated are the most common. One of the major breakthroughs in the design of this electronic equipment has been the Enhanced-Tunnel-Diode (ETD) circuit. In this type of circuit, a tunnel diode is used as the switching element from which output signals having two distinct levels may be obtained and a storage diode, or enhanced diode, is used as the control element. That is, whether or not switching current is applied to the tunnel diode is controlled by the storage diode.

A plurality of logic circuits using the ETD design have been produced. The instant circuit performs the non-inverting OR-logic function using ETD principles in NRZ operation and is an improvement over the OR logic circuit disclosed in the copending application entitled Logic Circuit by J. S. Cubert, filed on Aug. 7, 1963, bearing Serial Number 300,438 and assigned to the assignee of this invention. That is, the application of an input signal to the circuit will enhance the first storage diode (i.e. store charge therein) such that a reverse current pulse may subsequently be passed therethrough in response to the application of a clock signal. This reverse current pulse is applied to the tunnel diode such that the operating condition of the tunnel diode may be switched. In the absence of an input signal the first storage diode is cut off. However, a second storage diode connected to the clock source can now conduct and store charge therein such that a reverse current signal having different polarity may be applied to the tunnel diode in response to a clock signal. By providing the reset network between the tunnel diode and the clock source, the tunnel diode operating condition may be switched by the application of a clock signal in the absence of an input signal. That is, the tunnel diode is in one condition when an input signal is applied, and is switched to another condition when an input signal is not applied.

Thus, one object of this invention is to provide a high-speed, OR-logic circuit having NRZ operation.

Another object of this invention is to provide a high-speed tunnel diode OR circuit which is compatible with other tunnel diode logic circuits.

Another object of this invention is to provide a high-speed, OR-logic circuit utilizing the current gain of storage diodes and the high speed switching of tunnel diodes to provide NRZ operation.

Figure 2:
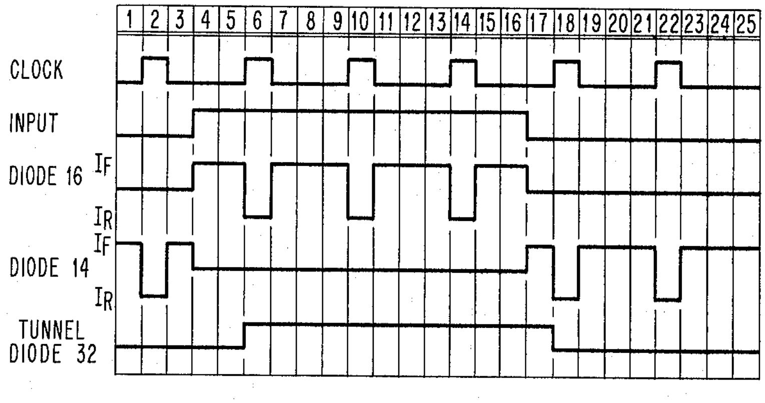

These and other objects and advantages of the subject circuit will become more readily apparent when the following description is read in conjunction with the attached drawings, in which:

FIGURE 1 is a schematic diagram of a non-inverting OR-logic circuit which uses NRZ operation; and FIGURE 2 is a timing diagram for the circuit shown in FIGURE 1.

Referring now to FIGURE 1, the input sources 10, each of which may be any conventional type of input source including a tunnel diode driving circuit or the like, are connected to the anodes of input diodes 12. There are N inputs (three are shown for convenience) where N is a function of, and limited by, the fan-in, fan-out characteristics of the circuits utilized. The input diodes 12 may be any type of high-speed germanium rectifier diode which exhibit little or no charge storage capabilities, for example an International Diode ID5–050 diode. The cathodes of input diodes 12 are connected to one terminal of inductor 50 which may be on the order of 0.5 nanohenries. The inductor 50 provides isolation between the inputs 10 and the clock source 24 and may, in fact, be eliminated if the question of isolation is not critical. In many cases, the self-inductance of the connecting lead between the cathodes of diodes 12 and the anode of storage diode 16 is sufficient to provide this isolation and a separate inductance is unnecessary. The cathode of storage diode 16, which may be any type of diode exhibiting charge storage capabilities as for example a General Electric CSD 686 diode, is connected to one terminal of resistor 18 which may be on the order of 4700 ohms. Another terminal of resistor 18 is connected to one terminal of source 20 which is returned to ground. Source 20 may be any conventional type of substantially constant potential source, for example a battery, which is capable of supplying approximately —8 volts with respect to ground potential. Also connected to the cathode of storage diode 16 is the cathode of diode 14 which is a storage diode similar to diode 16. The anode of diode 14 is connected to winding 36 which is returned to ground. Winding 36 is the primary winding of transformer T1 which has the secondary winding 40 thereof connected between ground and the cathode of diode 34, which is described in detail subsequently. The cathode of rectifier diode 22 is connected to the cathodes of diodes 14 and 16. Diode 22 may be any type of rectifier diode, preferably a high speed switching diode which exhibits little or no charge storing capabilities for example a Fairchild FD–600. The anode of diode 22 is connected to source 24 which may be any conventional type of source capable of supplying periodically recurring pulses, and in the preferred embodiment, is a regularly recurring clock pulse source. The pulses supplied may have a base value of approximately zero volts and a peak magnitude of approximately +3.0 volts. Connected to the anode of storage diode 16 is the anode of coupling diode 26. Diode 26 is a high-speed switching silicon rectifier diode exhibiting little or no charge storage capabilities similar to diode 22. The cathode of diode 26 is connected to the anode of tunnel diode 32. Tunnel diode 32 may typically be an RCA 1N3129 tunnel diode which has a peak current value of approximately 20 milliamperes. The cathode of tunnel diode 32 is connected to a suitable potential source, for example ground. Also connected to the anode of tunnel diode 32 is one terminal of resistor 30 which may be approximately 250 ohms. Another terminal of resister 30 is connected to source 28 which may be any conventional type of source capable of supplying a substantially constant potential on the order of about +4 volts. The combination of source 28 and resistor 30 produces a substantially constant current which is supplied to the tunnel diode such that the tunnel diode is biased for bistable operation. Also connected to the anode of tunnel diode 32 is the anode of diode 34 which has the cathode thereof connected to winding 40. Diode 34 may be similar to the other high-speed rectifier diodes in the circuit. The outputs 38 are also connected to the anode of tunnel diode 32. There are M outputs (three of which are shown for convenience) where M is determined by the fan-in, fan-out capabilities of this tunnel diode circuit.

The operation of the circuit of FIGURE 1 may be more readily understood when the timing diagram shown in FIGURE 2 is described concurrently.

In preferred embodiments, the input signal may be applied by a clocked input circuit such that the input signals are synchronized with the clocking of the instant circuit. However, for purposes of general application, this limitation is not imposed here and it is assumed that the input signal supplies sufficient charging current to the storage diodes. As shown in FIGURE 2, the input signal is a low level signal between time periods T1 and T3. This low level input signal which, if assumed to be supplied by a preceding tunnel diode circuit, may be on the order of +50 millivolts. Inasmuch as the input diodes 12, if germanium, require a potential drop thereacross of at least 250 millivolts before any substantial current conduction occurs, diodes 12 are effectively reverse biased. That is, diode 14 effectively clamps the cathode of diode 16 at a potential of about −600 millivolts. This potential is insufficient to cause conduction of the series circuit comprising diodes 12 and 16. Therefore, the cathodes of diodes 12 are effectively clamped at a potential less than ground but greater than −600 millivolts, for example about −100 millivots. This assures that the diodes 12 will be cut off. Since storage diode 16 is effectively cut off, no forward current ($I_F$) flows therethrough and the charge stored therein is negligible. However, a forward current ($I_F$) exists in storage diode 14 inasmuch as the anode thereof is grounded and the cathode thereof is returned to the negative potential source 20. Because of this forward current flow through storage diode 14, charge is stored therein. With the subsequent application of a clock signal by set clock source 24 at time period T2, the positive going signal is passed via diode 22 to storage diode 14. Because of the stored charge therein, storage diode 14 is capable of conducting a reverse current ($I_R$) as shown in FIGURE 2 at time period T2. Thus, the clock signal supplied at time period T2 passes through storage diode 14, in the reverse direction, and winding 36 to ground. This signal induces a signal in winding 40. According to the "dot convention" this induced signal has a polarity such that current is drawn from tunnel diode 32, through diode 34 to ground. This is, diode 26 is cut off by the low level input signal, outputs 38 are high impedances and the current source (source 28 and resistor 30) is a constant current source. Thus, tunnel diode 32 is reset to or remains in the low voltage operating condition.

At time period T4, the input signal supplied by at least one of sources 10 switches to the high level. This high level signal, which is assumed to be supplied by a preceding tunnel diode circuit, is on the order of +450 millivolts which is sufficiently high to turn on the input diodes 12. The potential drop which exists across any of diodes 12, when conducting, is on the order of 250 to 300 millivolts. Therefore, the potential at the cathodes of diodes 12 and the anodes of storage diode 16 and rectifier diode 26 rises to approximately +150 to +200 millivolts. This potential is insufficient to switch diode 26 to the high conducting region (since it requires a potential drop thereacross on the order of 500 millivolts) especially inasmuch as the cathode thereof is maintained at a potential of approximately +50 millivolts by the tunnel diode 32. However, the increased potential at the anode of storage diode 16 causes forward current conduction therethrough. This conduction also raises the potential at the cathode of diodes 16 and 14 to about −100 millivolts such that diode 14 is effectively cut off because of the fixed ground potential level at the anode thereof. Thus, with the application of a high level input signal, forward current ($I_F$) flows through diode 16 thereby storing charge therein and diode 14 is cut off whereby no charge is stored therein. With the subsequent application of the set clock signal by source 24 at time periods T6, T10, and T14 reverse current ($I_R$) passes through storage diode 16. The clock pulse, which is approximately +3.0 volts, is large enough that, in spite of the potential drops across diodes 22 and 16, the potential at the anode of diode 26 is increased sufficiently to permit conduction therethrough. At the same time, because of the high-speed of the switching signals permitted by diode 16, the harmonic content of the signal is sufficient to cause inductor 50 to exhibit a very large impedance such that feedback through diodes 12 is avoided. (As noted supra, inductor 50 may be eliminated if feedback is not a problem.) Since diode 26 is conducting a positive going signal, the potential and current at the anode of tunnel diode 32 increase sufficiently (including required overdrive) to cause tunnel diode 32 to switch to the high voltage operating condition. When the tunnel diode has switched, the potential at the anode thereof is at least +450 millivolts, even after the clock pulse is terminated, such that output signals may be derived at any of the outputs 38.

The increased potential is ineffective to produce any other effect on the circuit. That is, only the changing signal through winding 40 tends to cause any signal to be induced in winding 36 (there is D.C. isolation). In addition, diode 34 is cut off by the relatively small potential applied at the anode theerof. Diode 34 is rendered conductive only when an additional signal (negative going) is applied via winding 40.

At time period T17, the input signal again assumes the low level and diodes 12 are effectively cut off. Therefore, forward current through storage diode 16 ceases and charge is not stored therein. When storage diode 16 is cut off, the potential at the cathode thereof falls sufficiently so that storage diode 14 can now conduct forward current and store charge therein. Thus, the application of the clock signal at time period T18 causes reverse current flow through diode 14 to ground via winding 36 and tunnel diode 32 is switched to the low voltage operating condition because of the signal induced in winding 40. Similarly, the clock signal supplied at T22 passes through diode 22, storage diode 14, and winding 36 to ground. Since tunnel diode 32 has not switched to the high voltage operating condition, this signal has no effect on the circuit.

Thus, in the absence of a high level input signal, the clock signal is carried through storage diode 14 and winding 36 whereby a signal is induced in winding 40. The induced signal creates current flow from tunnel diode 32, via diode 34 such that tunnel diode 32 is switched to or remains in the low voltage operating region. On the contrary, however, with the application of a high level input signal by any of sources 10, the storage diode 16 conducts forward current and stores charge therein while diode 14 is cut off. With the subsequent application of a set clock signal, reverse current flows through storage diode 16 and the current pulse is applied to tunnel diode 32 to switch the operating condition thereof to the high voltage condition. Thus, when any one of the inputs is high, the output signal is high, and when all of the inputs are low, the output signal remains low. This is non-inverting, OR logic operation. Moreover, since the NRZ operation is performed, a separate reset clock circuit is not required.

It is to be understood, of course, that by changing the polarities of the diodes or the sources shown, modifications may be made in the operation of the circuit, as for example modifications may be made upon the levels of the input and output signals such that negative-going signals may be substituted for positive-going signals.

Further modifications in components or component values may be suggested to those skilled in the art; however, these modifications are meant to be included withiin the scope of this description so long as the basic principles thereof are followed. That is, the specific configurations and components shown are used to suggest preferred embodiments and are not meant to limit the scope of this invention.

The embodiments of the invention in which an exclusive property or privilege is claimed are defined as follows:

1. A non-inverting logic circuit comprising, at least one input means for supplying input signals having two different levels, a bistable device exhibiting negative resistance characteristics between different stable operating regions, a first current source connected to said bistable device to bias said device for bistable operation, first unilaterally conducting means connected between said bistable device and said input means, a second current source, first charge storage means connected between said second current source and said input means, said first charge storage means exhibiting charge storing capabilities only when said input signal has one level but not when said input has a different level, a transformer having one terminal of each of the primary and secondary windings thereof connected to said second current source, second unilaterally conducting means connected between said bistable device and another terminal of said primary winding of said transformer, second charge storage means connected between said second current source and another terminal of said secondary winding of said transformer and exhibiting charge storing capabilities only when said first charge storage means is not storing charge therein, and a source of periodic pulses connected to said first and second charge storage means for alternatively causing reverse current in one of said charge storage means subsequent to the storage of charge therein.

2. A non-inverting logic circuit with NRZ operation comprising, at least one input means for supplying input signals having two different levels, a bistable device exhibiting negative resistance characteristics between first and second stable operating regions, a first current source connected to said bistable device to bias said device for bistable operation, first unilaterally conducting means connected between said bistable device and said input means, a transformer having first and second windings inductively coupled, a second current source, a first terminal of each of said first and second windings connected to said second current source, first charge storage means connected between said second current source and said input means, said first charge storage means exhibiting charge storing capabilities only when said input signal has one level but not when said input has a different level, second charge storage means connected between said second current source and a second terminal of said first winding and exhibiting charge storing capabilities only when said first charge storage means is not storing charge therein, second unilaterally conducting means connected between a second terminal of said second winding and said bistable device, a source of periodic pulses connected to said first and second charge storage means for alternatively causing reverse current in one of said charge storage means subsequent to the storage of charge therein such that current is supplied to said bistable device via said first charge storage means and said first unilaterally conducting means to switch said bistable device from said first stable operating region to said second stable operating region and to said bistable device via said second charge storage means and said second unilaterally conducting means to switch said bistable device from said second stable operating region to said first stable operating region, and output means connected to said bistable device.

3. A non-inverting logic circuit comprising, at least one input gate means for supplying input signals having a high level and a low level, a bistable tunnel diode exhibiting negative resistance characteristics between different stable operating regions, a first current source connected to said bistable tunnel diode to bias said device for bistable operation, first rectifier diode means having the cathode of said diode means connected to said bistable tunnel diode and the anode of said diode means connected to said input means, a second current source, a transformer having one terminal of each of the primary and secondary windings thereof connected to said second current source, first charge-storage diode means having the cathode thereof connected to said second current source and the anode thereof connected to said input gate means, said first charge storage diode means exhibiting charge storing capabilities only when said input signal exhibits said high level, second charge-storage diode means having the cathode thereof connected to said second current source and the anode thereof connected to another terminal of said primary winding, said second charge storage diode means exhibiting charge storing capabilities only when said input signal exhibits said low level and said first charge storage diode means is not storing charge therein, second rectifier diode means having the anode thereof connected to said tunnel diode and the cathode thereof connected to another terminal of said secondary winding, and a source of periodic pulses connected to said first and second charge storage diode means for alternatively causing reverse current in one of said charge storage means subsequent to the storage of charge therein.

4. In combination, a tunnel diode having an anode and a cathode and characterized by high and low voltage operating regions, first current source means connected between said anode and said cathode of said tunnel diode to bias said tunnel diode for bistable operation, first and second rectifier diodes each having an anode and a cathode, first and second charge-storage diodes each having an anode and a cathode, first and second windings inductively coupled together, second current source means connected to one terminal of each of said first and second windings, said first rectifier diode having the anode thereof connected to the anode of said tunnel diode and the cathode thereof connected to another terminal of said second winding, said first charge-storage diode having the anode thereof connected to the anode of said second rectifier diode and the cathode thereof connected to said second current source means, said second rectifier diode having the cathode thereof connected to said anode of said tunnel diode, said second charge-storage means having the anode thereof connected to another terminal of said first winding and the cathode thereof connected to said cathode of said first charge storage diode, pulse supplying means connected to said cathodes of said charge storage diodes for selectively supplying signals thereto, input supplying means connected to the anodes of said first charge-storage diode and said second rectifier diode, and output means connected to said anode of said tunnel diode.

5. In combination, a tunnel diode having anode and cathode electrodes and characterized by high and low voltage operating regions, first current source means connected to the electrodes of said tunnel diode to bias said tunnel doide for bistable operation, first and second rectifier diodes each having an anode and a cathode, first and second charge-storage diodes each having an anode and a cathode, first and second windings inductively coupled together, second current source means connected to one terminal of each of said first and second windings, said first rectifier diode having the anode thereof connected to the anode of said tunnel diode and the cathode thereof connected to another terminal of said second winding, said first charge-storage diode having the anode thereof connected to the anode of said second rectifier diode and the cathode thereof connected to said second current source means, said first rectifier diode having the cathode thereof connected to the anode of said tunnel diode, said second charge-storage means having the anode thereof connected to another terminal of said first winding and the cathode thereof connected to said cathode of said first charge storage diode, pulse supplying means connected to said cathodes of said charge storage diodes for selectively supplying signals thereto, input supplying means connected to the anodes of said first charge-storage diode and said second rectifier diode, and output means connected to said anode of said tunnel diode, said input supplying means adapted to provide high and low level input signals alternatively, said first charge storage diode operative to store charge therein in response to a high level input signal, said second charge storage diode operative to store charge therein in response to a low level input signal, said pulse supplying means producing a reverse current signal in the charge storage diode which has stored charge therein such that said reverse current signal is applied to said tunnel diode to control the operating region thereof.

6. A logic circuit comprising, input means for supplying input signals having two different levels, a bistable device exhibiting an unstable operating region between different stable operating regions, bias means connected to said bistable device to bias said device for bistable operation, first coupling means connected between said bistable device and said input means, current source means, first charge storage means connected between said current source and said input means, said first charge storage means exhibiting charge storing capabilities only when said input signal has one level, a transformer having a plurality of terminals on each of the first and second windings thereof, one terminal of each of said windings connected to said current source means, second coupling means connected between said bistable device and another terminal of said first winding of said transformer, second charge storage means connected between said current source means and another terminal of said second winding of said transformer and exhibiting charge storing capabilities only when said first charge storage means is not storing charge therein, and a source of periodic pulses connected to said first and second charge storage means for causing reverse current in one of said charge storage means subsequent to the storage of charge therein.

7. A logic circuit comprising, input gate means for supplying input signals alternatively having high and low levels, a tunnel diode exhibiting negative resistance characteristics between different stable operating regions, means connected to said bistable tunnel diode to bias said device for bistable operation, first rectifier diode means having the cathode thereof connected to said bistable tunnel diode and the anode thereof connected to said input means, current source means, a transformer having primary and secondary windings each of which windings has a plurality of terminals, one terminal of each of said windings connected to said current source means, first charge storage diode means having one electrode thereof connected to said current source means and another electrode thereof connected to said input gate means, said first charge storage diode means exhibiting charge storing capabilities only when said input signal exhibits said high level, second charge storage diode means having one electrode thereof connected to said current source means and another electrode thereof connected to another terminal of said primary winding, said second charge storage diode means exhibiting charge storing capabilities only when said first charge storage diode means is not storing charge therein, second rectifier diode means having the anode thereof connected to said tunnel diode and the cathode thereof connected to another terminal of said secondary winding, and a source of periodic pulses connected to said first and second charge storage diode means for alternatively causing reverse current in one of said charge storage means subsequent to the storage of charge therein.

8. In combination, a tunnel diode having an anode and a cathode and characterized by high and low voltage operating regions, bias means connected to said anode and reference to said cathode of said tunnel diode to bias said tunnel diode for bistable operation, first and second charge-storage diodes each having an anode and a cathode, first and second windings inductively coupled together, each of said windings having a plurality of terminals, current source means connected to one terminal of each of said first and second windings, first coupling means connected between the anode of said tunnel diode and another terminal of said second winding, second coupling means connected between the anode of said first charge storage diode and said current source means and said anode of said tunnel diode, said second charge storage diode having the anode thereof connected to another terminal of said first winding and the cathode thereof connected to said cathode of said first charge storage diode, pulse supplying means connected to said cathodes of said charge storage diodes for selectively supplying signals thereto, input supplying means connected to said second coupling means and to the anode of said first charge storage diode, and output means connected to said anode of said tunnel diode.

References Cited by the Examiner

UNITED STATES PATENTS

| | | | |
|---|---|---|---|
| 2,908,830 | 10/1959 | Mason et al. | 307—88.5 |
| 3,001,087 | 9/1961 | Hans-Joachim Harloff | 307—88.5 |
| 3,106,644 | 10/1963 | Retzinger | 307—88.5 |
| 3,112,453 | 11/1963 | Holt | 307—88.5 |
| 3,184,605 | 5/1965 | Herzog | 307—11.5 |

ARTHUR GAUSS, *Primary Examiner.*

JOHN W. HUCKERT, *Examiner.*

R. H. EPSTEIN, *Assistant Examiner.*